UNITED STATES PATENT OFFICE.

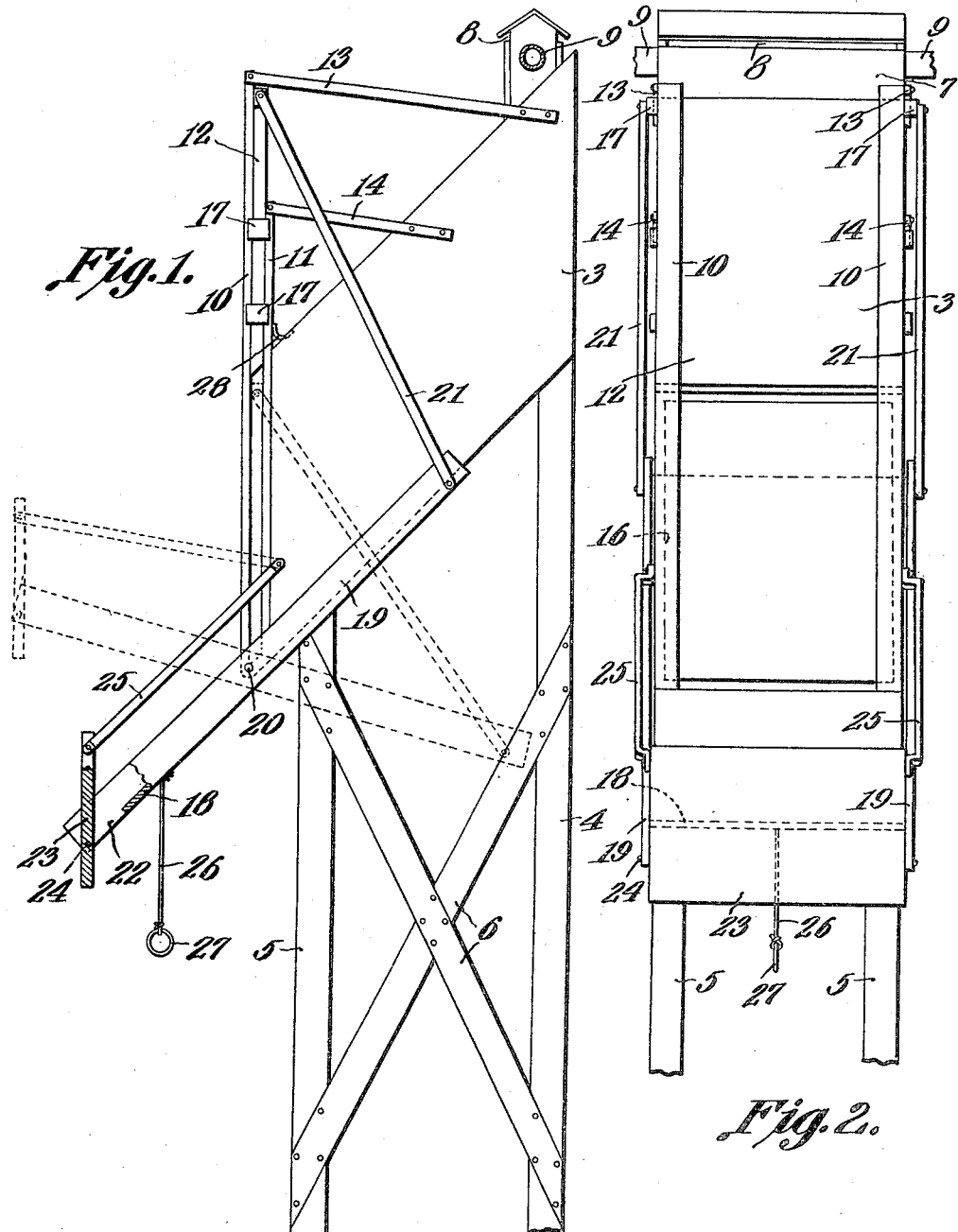

WILLIAM H. COURSEY, OF BROWNSBORO, TEXAS.

SEED-HOPPER.

1,111,057.　　　　Specification of Letters Patent.　　Patented Sept. 22, 1914.

Application filed November 6, 1913.　Serial No. 799,576.

*To all whom it may concern:*

Be it known that I, WILLIAM H. COURSEY, a citizen of the United States, residing at Brownsboro, in the county of Henderson and State of Texas, have invented a new and useful Seed-Hopper, of which the following is a specification.

This invention relates to a seed hopper.

An object of the present invention is to provide a hopper adapted to receive seed or cotton therein and to properly and conveniently control the discharge therefrom.

A further object is to provide a hopper with a chute extending therebeneath and with a controlling door mechanically connected to and operated by said chute so that when the chute is lowered, the door will be simultaneously opened, allowing for the discharge of material from said hopper into the chute from which it is delivered into a wagon or suitable receptacle.

A further object is to provide a chute pivotally secured to a hopper so that when it is lowered into an inclined position the material from the hopper will be discharged therein and delivered thereby, and to so arrange the door of the hopper that the door will be closed by a raising of the chute.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed, without departing from the spirit of the invention.

In the drawings accompanying this specification and forming a part thereof, the preferable embodiment of my invention is illustrated, in which:—

Figure 1 is a view in side elevation of my improved seed hopper, with parts thereof broken away so as to more clearly illustrate the construction thereof. Fig. 2 is a front view of the same.

Referring to the drawings in which corresponding parts are indicated by similar numerals, the hopper includes the bin or receptacle 3, the bottom of which is inclined at a considerable angle to the horizontal so that the cotton seed or other material disposed therein will gravitate downwardly to the lower end thereof. The bin 3 is mounted some little distance above the ground by means of the upright posts 4 and 5, and between which posts extend a suitable number of bracing members 6. Communicating with the upper portion of the bin is the casing or housing 7 which, as clearly illustrated, is provided with the ventilating openings or slots 8 extending therethrough so that the air entering by means of the pipe or flue 9 which conducts the seed or cotton from the cotton gin to the bin will readily escape therefrom. Rigidly secured to the lower outlet extremity of the bin 3 are the slides 10 and 11, between which the door 12 which acts as a gate valve slides. The slides 10 are rigidly secured at their lower extremities to the bin 3 and are held rigidly in place at their upper extremities by the brace rods or struts 13. The inner slides 11 are also directly secured to the bin 3 and are suitably held at their upper extremities by the braces or struts 14, the latter being arranged so as not to interfere with the links which reciprocate the door.

The lower extremity of the bin 3 is open as illustrated in dotted lines at 16 in Fig. 2 and in front of and to close which the door 12 is provided. In order to properly guide the door 12 in its reciprocating motion, the guide blocks 17 are secured thereto which project over the edges of the slide, contact therewith, and hold the door properly spaced with respect to the slide and bin opening.

Pivotally secured to the bin adjacent its lower and front extremity is the chute 18, the sides 19 of which project beyond and in the rear of the pivotal support 20 and to which arms are connected adjacent their rear extremities, the links 21. The links 21 are pivotally secured to the door 12 and are adapted to raise and lower the same by and with the rotating of the chute 18. The chute 18 as illustrated, is provided with the opening 22 extending through the bottom thereof adjacent the lower extremity and through which the grain and seed is delivered. A check 23 is pivotally secured as at 24 to the side of the chute beyond the opening 22 thereof and always remains in a vertical position by reason of the fact that it is pivotally connected by means of the link 25 to the bin a slight distance above the chute. Thus the check will be mounted for parallel motion and will always remain in a substantially vertical position to properly check and guide the seed or material in a downward direction. Secured to the under portion of the chute adjacent its lower end and depending therefrom is a flexible rope or chain 26 provided with the ring 27 secured to the lower extremity thereof so that the chute may be easily drawn to its lowermost position.

When grain or seed is introduced within the bin through the flue 9 it will settle within and gradually fill the bin 3. When at any time it is desired to remove a quantity of the material from the bin, the flexible chain or rope 26 is grasped and the chute drawn from the position illustrated in dotted lines in Fig. 1, to its lowermost position as illustrated in full lines in said figure. The drawing of the front end of the chute downwardly produces a corresponding upward motion of the sides 19 beyond the pivot support 20 so that the link 21 will exert an upward force upon the door whereby the same will be raised to uncover the discharge outlet or opening of the bin so that the material will be discharged therefrom into the chute 18. The material travels down the chute 18 and contacts with the stop or check 23 whereby its downward velocity will be considerably checked and the direction will be changed to a direct downward motion so that it will fall into a wagon or receptacle disposed beneath the chute in a quiet manner. When sufficient grain or seed has been discharged from the bin into the wagon or receptacle, the flexible chain or rope 26 is released, allowing the door to move downward, to thereby draw the forward end of the chute up into its raised position as illustrated in dotted lines in which position it will be out of the way of travel of the wagon or other vehicle. The weight of the door may be so proportioned that it will be sufficient to immediately close to draw the chute up when the latter is released, or it may be so proportioned that the various parts will balance so that the chute will remain in the position in which it is placed, so that the amount of opening or discharge outlet from the bin will be placed at any desired amount and will remain so proportioned. A gutter 28 is secured along the top of the bin 3 and prevents water from entering between the sliding door 12 and the opening which is covered by the latter.

Having thus fully described my invention, what I claim is:—

1. A hopper comprising a bin, means for supplying grain or seed thereto, said bin provided with a lower discharge opening, a door slidably mounted in front of said opening, a chute pivotally secured to the said bin below said discharge opening, the sides of said chute extended beyond the said pivotal connection thereof, links extending between the two side projections and the said door, the raising and lowering of the chute causing the closing and opening of said bin discharge outlet.

2. A hopper comprising a bin with a lower discharge opening, a door slidably mounted in front of said opening, a chute pivotally secured to said bin below said discharge opening, rearwardly extending arms carried by said chute, links pivotally secured to the door and to the rear extremities of said arms, the raising and lowering of the chute causing the closing and opening of said bin discharge outlet, respectively.

3. A device for hoppers comprising a movable chute, a check secured to the lower extremity of said chute, a supporting structure for said chute, and means engaging the supporting structure and check, holding said check in fixed relation with respect to the vertical limiting the check to translatory motion and positively preventing a rotatory motion.

4. Apparatus of the class described comprising a chute, a check disposed below and in front of the lower extremity thereof, and links pivotally secured to the check and to a supporting structure mounting said check for parallel motion.

5. Apparatus of the class described including a chute, a stop positioned below and in front of said chute adapted to check the material passing therefrom, means pivotally supporting said chute, links pivotally secured to said supporting means and to the upper extremity of said stop mounting the same for parallel motion and automatically holding the same in a vertical position.

In testimony that I claim the foregoing as my own, I have hereto affixed my signature in the presence of two witnesses.

WILLIAM H. COURSEY.

Witnesses:
 MONROE HOLINSON,
 T. M. LOFTIS.

---

Copies of this patent may be obtained for five cents each, by addressing the "Commissioner of Patents, Washington, D. C."